March 17, 1931. J. LANZ 1,796,292

ELECTRIC MOTOR

Filed March 22, 1929

Inventor
John Lanz

By Rockwell & Bartholow
Attorneys

Patented Mar. 17, 1931

1,796,292

UNITED STATES PATENT OFFICE

JOHN LANZ, OF NEW HAVEN, CONNECTICUT, ASSIGNOR TO THE A. C. GILBERT COMPANY, OF NEW HAVEN, CONNECTICUT, A CORPORATION OF MARYLAND

ELECTRIC MOTOR

Application filed March 22, 1929. Serial No. 349,046.

This invention relates to electric motors, this application being a continuation in part of my application Serial No. 125,702 filed July 29, 1926.

This invention particularly relates to improvements in the structure of the motor and more especially to novel means of mounting the parts of an electric motor within and by a sheet metal casing, and means for mounting the motor on a base or other supporting member.

One of the objects of this invention is to provide an efficient motor of novel and improved construction, and which is economical to manufacture.

Another object of this invention is to provide a novel sheet metal casing which is adapted to receive and retain therein the parts of an electric motor.

Another object of this invention is to provide an electric motor with improved means for mounting the same or parts thereof to a base or other supporting member.

A further object of this invention is to provide an electric motor with an improved form of casing by a portion of which the motor parts may be positioned and secured while the motor in its entirety is firmly secured to a supporting member.

To these and other ends, the invention consists in the novel features and combinations of parts to be hereinafter described and claimed.

Figure 1:
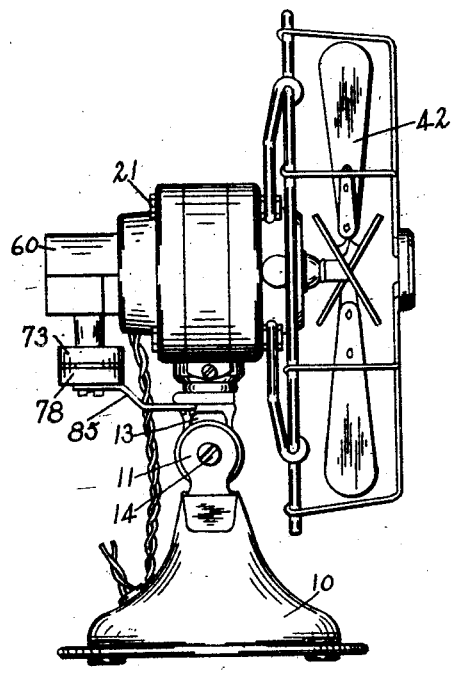
Fig. 1 is a side view of an electric fan embodying the features of this invention.
Figure 2:
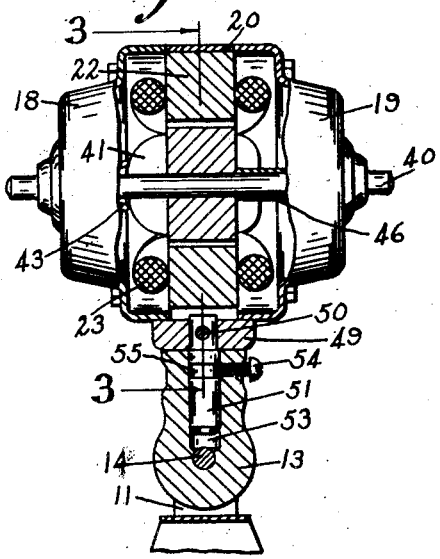
Fig. 2 is a partially sectioned view showing the interior of motor of said fan and the novel form of casing therefor.
Figure 3:
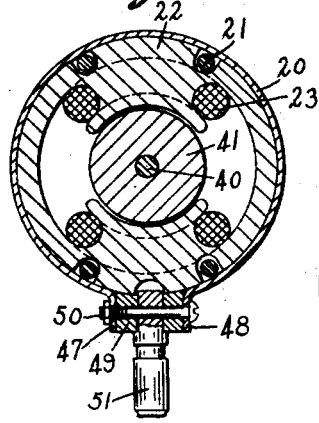
Fig. 3 is a section on line 3—3 of Fig. 2.

In the form of electric fan shown in Figs. 1, 2 and 3, the motor has a base 10, provided at the upper portion thereof with a pair of upstanding ears 11, between which is pivotally mounted a bushing 13 upon the pivot screw 14. Upon the end of the pivot screw 14 is threaded a wing nut (not shown), by which the ears 11 may be clamped against the flat sides of the lower end of the bushing 13, to secure the motor in adjusted tilted positions relatively to the base.

The motor casing preferably consists of front and rear end members 18 and 19, and an intermediate section 20, all of which parts are preferably stamped from sheet metal and held together by bolts 21, which pass through the two end members and also through the field core 22, so as to hold the parts of the motor casing and the field core in assembled relation. The intermediate casing section 20 is clamped in position between the end sections, its side edges being in engagement with their inner edges, and said end sections being movable toward the intermediate section by the bolts 21. The field winding is shown at 23, and may be of any preferred type.

An armature shaft 40 carries the armature 41 and projects at both ends from the motor casing. Upon its front end are secured the fan blades 42 and secured adjacent the front end is a commutator 43. A sleeve 46 surrounds the rear end of the shaft and abuts a bearing member to prevent excess longitudinal play of the shaft within the casing.

The middle section 20 of the motor casing is provided at its bottom portion with depending ears 47 and 48, by which the motor casing is secured to a bearing block 49 by means of a bolt 50 which passes through an opening in the block, and registering openings in the ears 47 and 48. The bolt 50 also passes through an opening in the upper end of a pin 51, received within a central opening in the bearing block 49, and secures this pin to the block and motor casing. The pin 51 projects from the block 49 and is received in a bore 53 formed in the bushing 13, being secured for rotating or oscillating movement therein by means of a screw 54 passing through the standard and entering an annular channel 55 formed in the pin 51.

The casing section 20, in this instance forming the middle section of the casing, is generally ring-shaped, being formed of a strip of sheet metal and wrapped about the periphery of the field core to substantially surround the same, and is clamped into tight engagement with the field core 22 by means of the bolt 50. This ring-shaped band 20, by means of the depending ears 47 and 48, in cooperation with the block 49 and pin 51, comprises the means whereby the motor in its entirety is mounted upon and secured to a suitable base or supporting member.

By being tightly and securely clamped about the field core 22 so as not to be displaceable with reference thereto, the section 20, due to its side edges being in abutting relation with the opposed side edges of the casing end members 18 and 19, assists in supporting the armature 41 and locating it relatively to the field core 22, the armature shaft 40 being journaled at each end thereof in bearings associated with each end member. By simultaneously securing a supporting member, such as the pin 51 to the motor while clamping the field core 22, the novel casing part 20 reduces the expense of manufacturing by simplifying the assembly of the product and reducing the number of parts required therefor.

The rear end of the armature shaft 40 extends into a gear housing 60, wherein is disposed suitable gearing which is adapted to drive a disk 73, which is in driving engagement with another disk 78. The driven disk 78 is suitably connected to the bushing 13 by means of a link 85, so as to cause the fan and motor to oscillate with respect to the bushing 13 and the base 10 when the driven disk 78 is rotated by the above mentioned gearing disposed within the gear housing 60. The structure and use of the above motor oscillating means is described in detail in my copending application referred to above.

Figure 4:
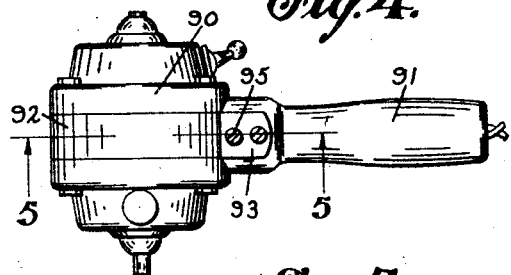
Fig. 4 is a side view of a similar motor mounted upon another form of supporting member and in a slightly modified manner.
Figure 5:
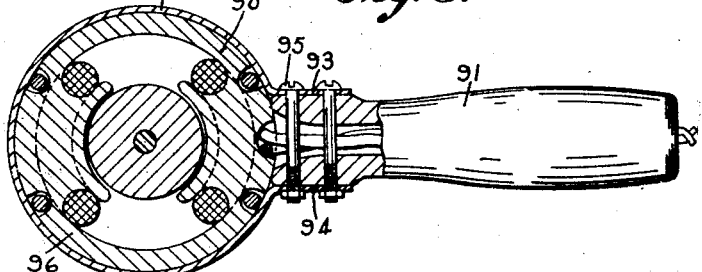
Fig. 5 is a section on line 5—5 of Fig. 4.

In the embodiment illustrated in Figs. 4 and 5, the motor 90 is secured to a supporting member in the form of a handle 91, by which the motor may be manually held and moved about. In this instance, the casing section 92 is provided with slightly longer ears 93 and 94 than the ears 47 and 48 previously described, in order to permit two or more bolts 95 to be used. The bolts 95 pass through corresponding openings in the ears 93 and 94 and one end of the handle 91, and securely clamp the casing part 92 about the field core 96 while securing the same to the handle 91. A comparatively rigid connection is obtained between the motor 90 and the handle 91 by this novel structure.

While I have shown and described two embodiments of my invention, it is understood that it is not to be limited to all of the details shown, but is capable of modification and variation which will lie within the spirit of the invention and the scope of the appended claims.

What I claim is:

1. In an electric motor, a casing enclosing the field and armature parts thereof, and a supporting member for said motor, a part of said casing surrounding the field part in clamped engagement therewith, and having its ends secured one on either side of said supporting member, and common means to draw said ends together to secure said casing part to said supporting member and to clamp said casing part to the field part.

2. In an electric motor, a field core, an armature, a casing enclosing the field core and armature, a part of said casing being wrapped about said field core and presenting spaced apart ears, each of said ears having a perforation therein, a supporting member for said motor having a perforation therein, said supporting member being disposed between said ears with the perforations thereof corresponding, and means disposed in said perforations to draw and secure said parts together and to clamp said casing part to said field core.

3. In an electric motor, a field core, an armature, a casing enclosing the field core and armature, said casing comprising end members and an intermediate member, said intermediate casing member comprising a strip of material wrapped about and secured to said field core, the side edge of each of said end members adjacent to and abutting the side edges of said intermediate casing member and means to draw said end members toward said intermediate member to clamp the latter therebetween.

4. In an electric motor, a casing enclosing the field core and armature thereof, said casing comprising end members and an intermediate end member, said intermediate casing member surrounding the field core, said end members abutting the side edges of said intermediate casing member, means passing through said end members and said field core to clamp said end members to said intermediate member supporting means for said motor comprising spaced apart ends on said intermediate casing member, a motor supporting member disposed between said ends, and common means to draw said ends together to secure said motor supporting member between said ends and to clamp said intermediate casing member to the field core.

5. In an electric motor, a casing for enclosing the internal parts of said motor including the field core, a part of said casing comprising a strip of material wrapped about the field core with its ends spaced apart, and means engaging each end to draw them together to clamp said casing part to the field core.

6. In an electric motor, a ring shaped field core, a strip of material wrapped about the field core with its ends spaced apart, a supporting member disposed between said ends, and means to draw said ends together to clamp said strip of material about the field core and to secure said ends to said supporting member.

7. In an electric motor, a field core, and means to support said field core comprising a strip of material disposed about the periphery of said field core with its ends disposed in opposed spaced apart relation, a motor supporting member received between and secured to the spaced apart ends of said strip and means to draw the spaced apart ends of said strip of material together to clamp the strip about said field core and secure it to said supporting member.

8. In an electric motor, a field core having a substantially continuous periphery, a strip of material wrapped about the periphery of said field core with its ends projecting therefrom and peripherally spaced apart, cup-shaped end members to cover the ends of said field core, the edge of each of said cup-shaped end members at the open end thereof abutting the adjacent side edge of said strip of material, means passing through each of said end members and said field core, said means being adapted to draw said end members toward each other to clamp said strip therebetween, a support for said motor disposed between the ends of said strip, and means passing through the ends of said strip and said motor support to draw said ends together to secure said strip to said field core and to clamp said motor support therebetween.

In witness whereof, I have hereunto set my hand this 20th day of March, 1929.

JOHN LANZ.